(12) United States Patent
Ding et al.

(10) Patent No.: US 11,455,820 B2
(45) Date of Patent: Sep. 27, 2022

(54) ULTRASONIC FINGERPRINT IDENTIFICATION COMPONENT, FINGERPRINT IDENTIFICATION DEVICE AND FINGERPRINT IDENTIFICATION DRIVING METHOD

(71) Applicant: BOE Technology Group Co., Ltd., Beijing (CN)

(72) Inventors: Xiaoliang Ding, Beijing (CN); Haisheng Wang, Beijing (CN); Yingming Liu, Beijing (CN); Pengpeng Wang, Beijing (CN); Likai Deng, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 28 days.

(21) Appl. No.: 17/054,845

(22) PCT Filed: Dec. 6, 2019

(86) PCT No.: PCT/CN2019/123657
§ 371 (c)(1),
(2) Date: Nov. 12, 2020

(87) PCT Pub. No.: WO2021/109121
PCT Pub. Date: Jun. 10, 2021

(65) Prior Publication Data
US 2021/0365655 A1   Nov. 25, 2021

(51) Int. Cl.
*G06K 9/28* (2006.01)
*G06V 40/13* (2022.01)
*G06V 40/12* (2022.01)

(52) U.S. Cl.
CPC ...... *G06V 40/1306* (2022.01); *G06V 40/1359* (2022.01)

(58) Field of Classification Search
CPC .................................................. G06V 40/1306
See application file for complete search history.

(56) References Cited

U.S. PATENT DOCUMENTS

| | | | | |
|---|---|---|---|---|
| 9,465,429 | B2 * | 10/2016 | Kitchens, II | G02F 1/13338 |
| 2014/0354596 | A1 * | 12/2014 | Djordjev | G06F 3/0421 |
| | | | | 345/175 |
| 2017/0059699 | A1 * | 3/2017 | Mathe | G01S 7/52079 |

FOREIGN PATENT DOCUMENTS

| | | |
|---|---|---|
| CN | 106919295 A | 7/2017 |
| CN | 106971172 A | 7/2017 |

(Continued)

*Primary Examiner* — Brian Werner
(74) *Attorney, Agent, or Firm* — Nath, Goldberg & Meyer; Joshua B. Goldberg

(57) ABSTRACT

There is provided an ultrasonic fingerprint identification component, including an ultrasonic fingerprint identification circuit, which includes a detection circuit and a source follower circuit, and a current supply circuit, where an output terminal of the source follower circuit is coupled to the current supply circuit through a signal reading line; the current supply circuit is configured to provide a constant current to the output terminal of the source follower circuit during an operation of the ultrasonic fingerprint identification circuit; the detection circuit is coupled to a receiving electrode of an ultrasonic sensor and is configured to output a sensing voltage to a sampling node according to an electric signal output by the receiving electrode of the ultrasonic sensor; and the source follower circuit is configured to output a corresponding source follower voltage to the signal reading line according to the sensing voltage under control of the constant current.

19 Claims, 8 Drawing Sheets

(56) References Cited

FOREIGN PATENT DOCUMENTS

| | | |
|---|---|---|
| CN | 109872683 A | 6/2019 |
| CN | 110210442 A | 9/2019 |
| CN | 110245636 A | 9/2019 |
| WO | 2015009635 A1 | 1/2015 |

* cited by examiner in a first sensing stage, the current supply circuit provides a constant current to the output terminal of the source follower circuit, the ultrasonic sensor does not transmit ultrasonic waves, the receiving electrode of the ultrasonic sensor outputs a first electrical signal, the detection circuit outputs a first sensing voltage to the sampling node according to the first electrical signal, and the source follower circuit outputs a first source follower voltage according to the first sensing voltage under control of the constant current — S1 in a second sensing stage, the current supply circuit provides a constant current to the output terminal of the source follower circuit, the ultrasonic sensor transmits ultrasonic waves and receives echoes reflected by the fingerprint, the receiving electrode of the ultrasonic sensor outputs a second electric signal, the detection circuit outputs a second sensing voltage to the sampling node according to the second electric signal, and the source follower circuit outputs a second source follower voltage according to the second sensing voltage under control of the constant current — S2

FIG. 10

ULTRASONIC FINGERPRINT IDENTIFICATION COMPONENT, FINGERPRINT IDENTIFICATION DEVICE AND FINGERPRINT IDENTIFICATION DRIVING METHOD

This is a National Phase Application filed under 35 U.S.C. 371 as a national stage of PCT/CN2019/123657, filed Dec. 6, 2019, the content of which is hereby incorporated by reference in its entirety.

TECHNICAL FIELD

Embodiments of the present disclosure relate to an ultrasonic fingerprint identification component, a fingerprint identification device and a fingerprint identification driving method.

BACKGROUND

The fingerprint identification technology based on ultrasonic waves is a novel fingerprint identification technology, and the main principle thereof is as follows: when a transmitted wave contacts an object (such as a finger), since the fingerprint has valleys and ridges, vibration intensities of reflected waves (also called echoes) are different, positions of the valleys and the ridges can be determined by detecting the vibration intensities of the reflected waves, and further, a fingerprint identification is realized.

A source follower circuit is a core component of an ultrasonic fingerprint identification circuit, an input terminal of the source follower circuit is coupled to a sampling node in the ultrasonic fingerprint identification circuit, and the source follower circuit is configured to output a signal at the sampling node as an input signal based on a source follower principle. An external processor acquires a current output by an output terminal of the source follower circuit through a signal reading line, and identifies the valleys and the ridges of the fingerprint based on a magnitude of the current.

SUMMARY

Embodiments of the present disclosure provides an ultrasonic fingerprint identification component, a fingerprint identification device and a fingerprint identification driving method.

In a first aspect, an embodiment of the present disclosure provides an ultrasonic fingerprint identification component, including; an ultrasonic fingerprint identification circuit and a current supply circuit, the ultrasonic fingerprint identification circuit includes: a detection circuit and a source follower circuit, an output terminal of the detection circuit and an input terminal of the source follower circuit are coupled to a sampling node, and an output terminal of the source follower circuit is coupled to the current supply circuit through a signal reading line;

the current supply circuit is configured to provide a constant current to the output terminal of the source follower circuit during operating of the ultrasonic fingerprint identification circuit;

the detection circuit is coupled to a receiving electrode of an ultrasonic sensor and is configured to output a sensing voltage to the sampling node according to an electric signal output by the receiving electrode of the ultrasonic sensor;

the source follower circuit is configured to output a corresponding source follower voltage to the signal reading line according to the sensing voltage under control of the constant current.

In some implementations, the current supply circuit includes: a reset circuit, a writing and compensation circuit, an output control circuit and a driving transistor, and a control electrode of the driving transistor, the reset circuit and the writing and compensation circuit are coupled to a control node;

the reset circuit is coupled to a first power supply terminal and a first control signal line and is configured to write a first voltage provided by the first power supply terminal to the control node in response to control of the first control signal line;

the writing and compensation circuit is coupled to a second power supply terminal, a second control signal line, a first electrode of the driving transistor, and a second electrode of the driving transistor, and is configured to write a second voltage provided by the second power supply terminal to the second electrode of the driving transistor and write a control voltage to the control node in response to control of the second control signal line, the control voltage being equal to a sum of the second voltage and a threshold voltage of the driving transistor;

the output control circuit is coupled to a third power supply terminal and a third control signal line and is configured to write a third voltage provided by the third power supply terminal to the second electrode of the driving transistor in response to control of the third control signal line;

the driving transistor is configured to output a driving current to the signal reading line in response to the control voltage and the third voltage to supply the constant current to the output terminal of the source follower circuit.

In some implementations, the reset circuit includes: a first transistor;

a control electrode of the first transistor is coupled to the first control signal line, a first electrode of the first transistor is coupled to the first power supply terminal, and a second electrode of the first transistor is coupled to the control node.

In some implementations, the writing and compensation circuit includes; a second transistor and a third transistor;

a control electrode of the second transistor is coupled to the second control signal line, a first electrode of the second transistor is coupled to the second power supply terminal, and a second electrode of the second transistor is coupled to the second electrode of the driving transistor;

a control electrode of the third transistor is coupled to the second control signal line, a first electrode of the third transistor is coupled to the first electrode of the driving transistor, and a second electrode of the third transistor is coupled to the control node.

In some implementations, the output control circuit includes: a fourth transistor;

a control electrode of the fourth transistor is coupled to the third control signal line, a first electrode of the fourth transistor is coupled to the second electrode of the driving transistor, and a second electrode of the fourth transistor is coupled to the third power supply terminal.

In some implementations, transistors in the current supply circuit are all N-type transistors;

or, the transistors in the current supply circuit are all P-type transistors.

In some implementations, the source follower circuit includes: a source follower transistor;

a control electrode of the source follower transistor is coupled to the sampling node, a first electrode of the source follower transistor is coupled to a fourth power supply terminal, and a second electrode of the source follower transistor is coupled to the output terminal of the source follower circuit.

In some implementations, the detection circuit includes: an input circuit and a noise reduction reset circuit;

the input circuit is coupled to a bias voltage terminal, an input control signal line and the receiving electrode of the ultrasonic sensor and is configured to write a first bias voltage provided by the bias voltage terminal to the receiving electrode of the ultrasonic sensor in response to control of the input control signal line;

the noise reduction reset circuit is coupled to the bias voltage terminal and is configured to write a second bias voltage provided by the bias voltage terminal to the sampling node, and the first bias voltage is smaller than the second bias voltage.

In some implementations, the input circuit includes: an input transistor;

a control electrode of the input transistor is coupled to the input control signal line, a first electrode of the input transistor is coupled to the bias voltage terminal, and a second electrode of the input transistor is coupled to the receiving electrode of the ultrasonic sensor;

the noise reduction reset circuit includes: a voltage supply diode;

a first electrode of the voltage supply diode is coupled to the bias voltage terminal, and a second electrode of the voltage supply diode is coupled to the sampling node.

In a second aspect, an embodiment of the present disclosure further provides a fingerprint identification device, including: at least one ultrasonic sensor and the ultrasonic fingerprint identification component provided in the above embodiment.

In some implementations, the fingerprint identification device includes a plurality of ultrasonic sensors arranged in an array and a plurality of ultrasonic fingerprint identification circuits arranged in an array, and the ultrasonic sensors are in one-to-one correspondence with the ultrasonic fingerprint identification circuits;

output terminals of source follower circuits in the ultrasonic fingerprint identification circuits in a same column are coupled to a same current supply circuit through a same signal reading line.

In some implementations, the fingerprint identification device includes a fingerprint identification functional area and a non-functional area located at a periphery of the fingerprint identification functional area;

the ultrasonic sensors and the ultrasonic fingerprint identification circuits are located in the fingerprint identification functional area, and the current supply circuits are located in the non-functional area.

In some implementations, the fingerprint identification device further includes: a display panel;

the ultrasonic sensors and the ultrasonic fingerprint identification components are fixed on an outer surface of the display panel in a plug-in mode;

alternatively, the ultrasonic sensors and the ultrasonic fingerprint identification components are integrated inside the display panel in an embedded mode.

In a third aspect, an embodiment of the present disclosure further provides a fingerprint identification driving method, which is based on the ultrasonic fingerprint identification component provided in the foregoing embodiment, and the fingerprint identification driving method includes:

in a first sensing stage, the current supply circuit provides a constant current to the output terminal of the source follower circuit, the ultrasonic sensor does not transmit ultrasonic waves, the receiving electrode of the ultrasonic sensor outputs a first electric signal, the detection circuit outputs a first sensing voltage to the sampling node according to the first electric signal, and the source follower circuit outputs a first source follower voltage according to the first sensing voltage under control of the constant current;

in a second sensing stage, the current supply circuit provides the constant current to the output terminal of the source follower circuit, the ultrasonic sensor emits ultrasonic waves and receives echoes reflected by a fingerprint, the receiving electrode of the ultrasonic sensor outputs a second electric signal, the detection circuit outputs a second sensing voltage to the sampling node according to the second electric signal, and the source follower circuit outputs a second source follower voltage according to the second sensing voltage under control of the constant current, so that an external processor can determine valleys and ridges of the fingerprint according to a difference value between the second source follower voltage and the first source follower voltage.

In some implementations, before the first sensing stage, a preliminary stage is further included, and the preliminary stage specifically includes:

in a reset stage, the reset circuit writes a first voltage provided by the first power supply terminal to the control node in response to control of the first control signal line;

in a writing and compensation stage, the writing and compensation circuit writes a second voltage provided by the second power supply terminal to the second electrode of the driving transistor and writes a control voltage to the control node in response to control of the second control signal line, the control voltage being equal to a sum of the second voltage and a threshold voltage of the driving transistor;

in an output stage, the output control circuit writes a third voltage provided by the third power supply terminal to the second electrode of the driving transistor in response to control of the third control signal line, and the driving transistor outputs a driving current to the signal reading line in response to the control voltage and the third voltage to supply the constant current to the output terminal of the source follower circuit.

DESCRIPTION OF DRAWINGS

FIG. 10 is a flowchart of a fingerprint identification driving method according to an embodiment of the present disclosure;

DESCRIPTION OF EMBODIMENTS

Figure 1:
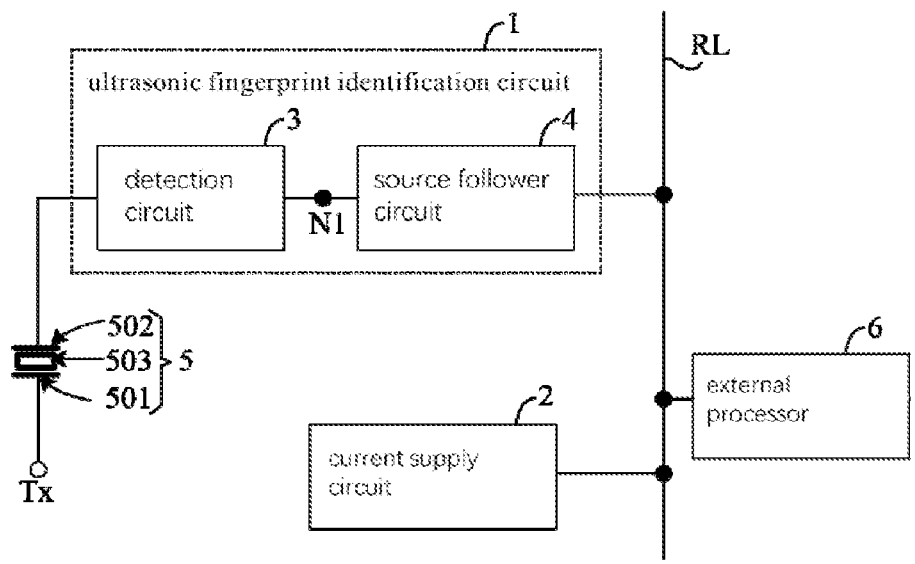
FIG. 1 is a schematic diagram of circuit structure of an ultrasonic fingerprint identification component according to an embodiment of the present disclosure.

In order to make those skilled in the art better understand technical solutions of the present invention, the following describes an ultrasonic fingerprint identification component, a fingerprint identification device and a fingerprint identification driving method provided by the present disclosure in detail with reference to accompanying drawings.

Example embodiments will be described more fully hereinafter with reference to the accompanying drawings, but which may be embodied in different forms and should not be construed as limited to the embodiments set forth herein. Rather, these embodiments are provided so that the present disclosure will be thorough and complete, and will fully convey the scope of the present disclosure to those skilled in the art.

Terminologies used herein are for a purpose of describing particular embodiments only and are not intended to be limiting of the present disclosure. As used herein, the singular forms "a", "an" and "the" are intended to include the plural forms as well, unless the context clearly indicates otherwise. It will be further understood that the terms "includes" and/or "including" when used in the specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements/signal lines/ports, these elements/signal lines/ports should not be limited by these terms. These terms are only used to distinguish one element/signal line/port from another element/signal line/port.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The transistors used in the embodiments of the present disclosure may be thin film transistors or field effect transistors or other elements with the same or similar characteristics, and since the source electrode and the drain electrode of the transistor are symmetrical, the source electrode and the drain electrode are not different. In the embodiments of the present disclosure, to distinguish the source electrode and the drain electrode of the transistor, one of the source electrode and the drain electrode is referred to as a first electrode, the other is referred to as a second electrode, and the gate electrode of the transistor is referred to as a control electrode. Further, transistors can be classified into N-type and P-type according to their characteristics; the N-type transistor is controlled by a high level control signal to be turned on and controlled by a low level control signal to be turned off; the P-type transistor is controlled by a low level control signal to be turned on and controlled by a high level control signal to be turned off. In the following embodiments, N-type transistors are used for explanation, and when the N-type transistors are used, the first electrode is the drain electrode of the N-type transistor, the second electrode is the source electrode of the N-type transistor, and for the P-type transistors, the first electrode is the source electrode of the P-type transistor, the second electrode is the drain electrode of the P-type transistor. It is contemplated that implementations of the following embodiments using the P-type transistors will be easily contemplated by those skilled in the art without creative effort, and therefore are within the scope of the embodiments of the present disclosure.

In the related art, since electrical characteristics of electrical elements in the source follower circuit may shift over time or in an environment (for example, threshold voltages of transistors shift), with a same input signal, a magnitude of a current output by the source follower circuit may change, that is, there is a signal distortion problem, so that fingerprint identification accuracy may be decreased. In order to solve the technical problem, embodiments of the present disclosure provide a solution.

FIG. 1 is a schematic diagram of circuit structure of an ultrasonic fingerprint identification component provided in an embodiment of the present disclosure, and as shown in FIG. 1, the ultrasonic fingerprint identification component includes: an ultrasonic fingerprint identification circuit 1 and a current supply circuit 2; where the ultrasonic fingerprint identification circuit 1 includes: a detection circuit 3 and a source follower circuit 4, an output terminal of the detection circuit 3 and an input terminal of the source follower circuit 4 are coupled to a sampling node N1, and an output terminal of the source follower circuit 4 is coupled to the current supply circuit 2 through a signal reading line RL.

The current supply circuit 2 is configured to provide a constant current to the output terminal of the source follower circuit 4 during an operation of the ultrasonic fingerprint identification circuit 1.

The detection circuit 3 is coupled to a receiving electrode 502 of an ultrasonic sensor 5, and the detection circuit 3 is configured to output a sensing voltage to the sampling node N1 based on an electrical signal output by the receiving electrode 502 of the ultrasonic sensor 5.

The source follower circuit 4 is configured to output a corresponding source follower voltage to the signal reading line RL in accordance with the sensing voltage under control of the constant current.

In the embodiment of the present disclosure, the ultrasonic sensor 5 includes: a transmitting electrode 501, a receiving electrode 502, and a piezoelectric element 503 positioned between the transmitting electrode 501 and the receiving electrode 502. In some implementations, a material of the piezoelectric element 503 may include: at least one of Polyvinylidene fluoride (PVDF for short), aluminum nitride (AlN), lead zirconate titanate (PZT), and zinc oxide (ZnO); a material of the transmitting electrode 501 may be a metal material such as silver; a material of the receiving electrode 502 may be a conductive material such as Indium Tin Oxide (ITO), which is not specifically limited in the embodiment of the present disclosure.

The process of performing ultrasonic fingerprint identification is as follows: in a transmitting stage, a driving signal (e.g., a sine wave signal) may be applied to the transmitting electrode 501, and a constant voltage is applied to the receiving electrode 502, so that the piezoelectric element 503 is excited by the voltage to generate an inverse piezoelectric effect, and transmits ultrasonic waves outward, and when the transmitted ultrasonic waves contact an object (e.g., a finger), the ultrasonic waves are reflected to generate echoes; the fingerprint of the finger has valleys and ridges, and thus a difference between vibration intensities of the echoes exists; in a sampling stage, the driving signal is stopped from being applied to the transmitting electrode 501 and a constant voltage is applied to the transmitting electrode 501, the constant voltage is stopped from being applied to the receiving electrode 502, the piezoelectric element 503 is affected by the echoes fed back by the finger, and due to a positive piezoelectric effect, an alternating current signal (which is a sine wave signal or an approximate sine wave signal) is generated on the receiving electrode 502, the alternating current signal can charge the sampling node N1, and a peak value (maximum voltage, also called as maximum peak voltage) of the signal at the sampling node N1 is measured, so that positions of the valleys and the ridges of the fingerprint can be determined, and further, the ultrasonic fingerprint identification is realized.

It should be noted that the sensing voltage in the embodiment of the present disclosure specifically refers to the maximum voltage at the sampling node N1 during the sampling stage.

Unlike the related art, which determines the maximum voltage at the sampling node N1 during a sampling process by collecting a current output by the output terminal of the source follower circuit 4, and identifies the valleys and the ridges of the fingerprint based on the maximum voltage, in the embodiment of the present disclosure, when performing fingerprint identification, the current supply circuit 2 supplies a constant current to the output terminal of the source follower circuit 4, and determines the change of the voltage at the sampling node N1 during the sampling process by detecting the voltage output by the output terminal of the source follower circuit 4, thereby determining the maximum voltage at the sampling node N1 during the process sampling. Based on the sampling principle described above, a mode of "double sampling and differencing" is adopted to determine the change of the voltage at the sampling node N1 after being applied with the alternating current signal generated by the echoes from the fingerprint, and the valleys and the ridges of the fingerprint can be determined based on the change of the voltage.

Figure 2:
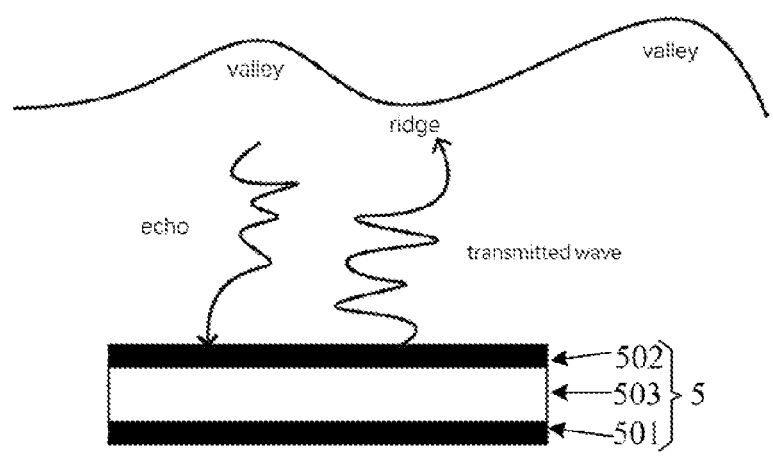
FIG. 2 is a schematic diagram when a fingerprint reflects ultrasonic waves.

FIG. 2 is a schematic diagram when the fingerprint reflects ultrasonic waves, and as shown in FIG. 2, generally, when the ultrasonic waves are reflected from the valleys of the fingerprint, moving distances of the ultrasonic waves are relatively long (compared with the case where the ultrasonic waves are reflected from the ridges of the fingerprint), and therefore intensities of the ultrasonic waves reaching the ultrasonic sensor 5 are relatively weak, at this time, the current output by the ultrasonic sensor 5 is relatively small, the change of the voltage at the sampling node N1 is relatively small, and when a reference voltage is constant, the maximum voltage at the sampling node N1 is relatively small; when the ultrasonic waves are reflected from the ridges of the fingerprint, since the moving distances of the ultrasonic waves are relatively short (compared with the case where the ultrasonic waves are reflected from the valleys of the fingerprint), the intensities of the ultrasonic waves reaching the ultrasonic sensor 5 are relatively strong, the current output by the ultrasonic sensor 5 is relatively large at this time, the change of the voltage at the sampling node N1 is relatively large, and when the reference voltage is constant, the maximum voltage at the sampling node N1 is relatively large. Based on the change of the voltage at the sampling node N1, the valleys and the ridges of the fingerprint can be determined.

In a case where the current at the output terminal of the source follower circuit 4 is constant, the voltage Vout at the output terminal of the source follower circuit 4 is in a linear positive correlation with the voltage Vin of the input terminal of the source follower circuit 4, which can be expressed as:

$$Vout=Vin+m$$

where m is a constant, and is determined by the electrical characteristics of electrical elements in the source follower circuit 4 and the multitude of the current at the output terminal of the source follower circuit 4.

In order to solve a problem of signal distortion caused by drift of the electrical characteristics of the electrical elements in the source follower circuit 4, in the present disclosure, the change of the voltage at the sampling node N1 after being applied with the alternating current signal generated by the echoes from the fingerprint is obtained by adopting the mode of "double sampling and differencing".

The principle of "double sampling and differencing" in the embodiment of the present disclosure is as follows.

First, in a first ultrasonic fingerprint identification stage (also referred to as a first sensing stage), the current supply circuit 2 supplies a constant current to the output terminal of the source follower circuit 4, which includes a constant voltage application stage and a first sampling stage. In the constant voltage application stage, constant voltages (which may be the same or different) are applied to the transmitting electrode 501 and the receiving electrode 502, and at this time, the piezoelectric element 503 does not output ultrasonic waves. In the first sampling stage, the application of the constant voltage to the receiving electrode 502 is stopped, and since the ultrasonic sensor 5 did not transmit ultrasonic waves in the first transmitting stage, the ultrasonic sensor 5 would not receive echoes in the first sampling stage. It should be noted that, due to the drift of the electrical characteristics of the electrical elements in the detection circuit 3, a voltage of a first electrical signal output by the receiving electrode 502 of the ultrasonic sensor 5 may not be equal to the constant voltage applied to the receiving electrode 502 in the first sampling stage. At this time, the detection circuit 3 outputs a first sensing voltage to the sampling node N1 according to the first electrical signal (the first sensing voltage includes an influence on the voltage at the sampling node N1 due to of shift of the electrical characteristics of the electrical elements in the detection circuit 3), and the source follower circuit 4 outputs a first source follower voltage according to the first sensing voltage under control of the constant current. At this time, the first sensing voltage is denoted as Vin_1, the first source follower voltage is denoted as Vout_1, Vout_1=Vin_1+m.

In a second ultrasonic fingerprint identification stage (also referred to as the second sensing stage), the current supply circuit 2 supplies a constant current (the same as the constant current supplied in the first ultrasonic fingerprint identification stage) to the output terminal of the source follower circuit 4, which includes a transmitting stage and a second sampling stage. In the transmitting stage, a driving signal (e.g., a sine wave signal) is applied to the transmitting electrode 501, a constant voltage is applied to the receiving electrodes 502, and the piezoelectric element 503 outputs ultrasonic waves. The transmitted ultrasonic waves can be reflected on a surface of the fingerprint to generate echoes. In the second sampling stage, a constant voltage is applied to the transmitting electrode 501, the application of the constant voltage to the receiving electrode 502 is stopped, the piezoelectric element 503 outputs a second electrical signal through the receiving electrode 502 after receiving the echoes, the detection circuit 3 outputs a second sensing voltage to the sampling node N1 according to the second electrical signal (the second sensing voltage includes an influence on the voltage at the sampling node N1 due to drift of the electrical characteristics of the electrical elements in the detection circuit 3, and an influence on the voltage at the sampling node N1 due to the alternating current signal generated by the echoes), and the source follower circuit 4 outputs a second source follower voltage according to the second sensing voltage under control of the constant current. At this time, the second sensing voltage is denoted as Vin_2, the second source follower voltage is denoted as Vout_2, Vout_2=Vin_2+m.

An external processor 6 can read the second source follower voltage Vout_2 and the first source follower voltage Vout_1 through the signal reading line RL and calculate a difference therebeween:

$$Vout\_2 - Vout\_1 = Vin\_2 + m - (Vin\_1 + m) = Vin\_2 - Vin\_1 \quad (1)$$

The difference between the second sensing voltage Vin_2 and the first sensing voltage Vin_1 can be obtained, that is, the change of the voltage at the sampling node N1 after being applied with the alternating current electrical signal generated by the echoes from the fingerprint can be obtained, and the valleys and the ridges of the fingerprint can be determined based on the difference. Generally, a threshold value can be preset according to experiments, when the difference between the second sensing voltage Vin_2 and the first sensing voltage Vin_1 is greater than or equal to the threshold value, it indicates that the change of the voltage generated after the alternating current electrical signal generated by the echoes of the fingerprint is applied to the sampling node N1 is relatively large, the current output by the ultrasonic sensor 5 is relatively large, and the echoes are reflected by the ridges of the fingerprint; when the difference between the second sensing voltage Vin_2 and the first sensing voltage Vin_1 is smaller than the threshold value, it indicates that the change of the voltage generated after the alternating current electrical signal generated by the echoes of the fingerprint is applied to the sampling node N1 is relatively small, the current output by the ultrasonic sensor 5 is relatively small, and the echoes are reflected by the valleys of the fingerprint.

As can be seen from the above equation (1), by adopting a manner of calculating the difference between the second source follower voltage Vout_2 and the first source follower voltage Vout_1, the difference between the second sensing voltage Vin_2 and the first sensing voltage Vin_1 can be calculated, the influence of drift of the electrical characteristics of the electrical elements in the source follower circuit 4 on a detection process can be eliminated (the difference between Vin_2 and Vin_1 is independent of m), and the signal reliability is ensured. Meanwhile, by calculating the difference between the second sensing voltage Vin_2 and the first sensing voltage Vin_1, the influence of drift of the electrical characteristics of the electrical elements in the detection circuit 3 on the voltage at the sampling node N1 can be eliminated, and the identification accuracy can be effectively improved.

Figure 3:
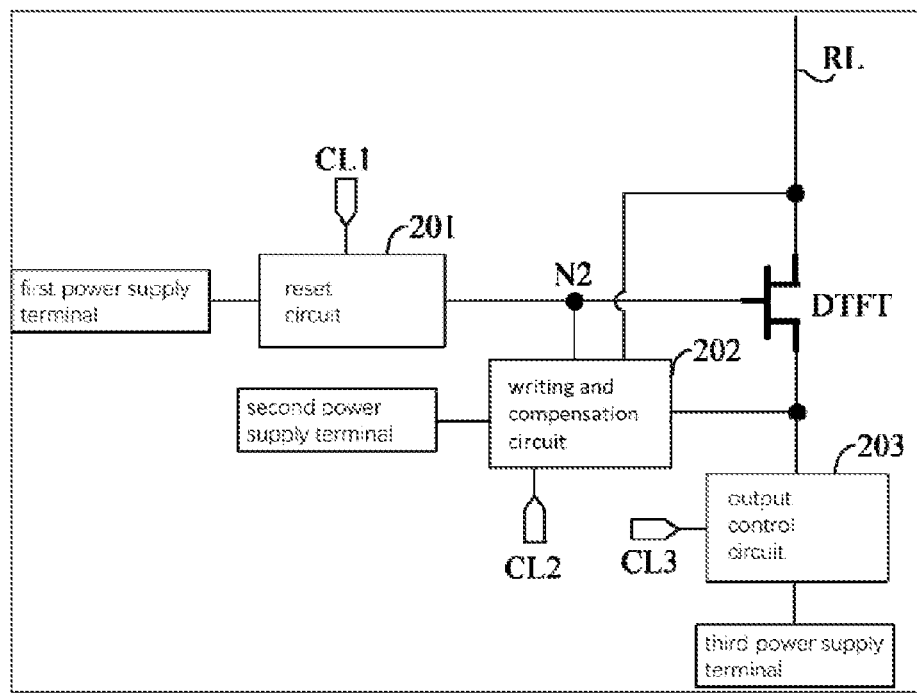
FIG. 3 is a schematic diagram of circuit structure of a current supply circuit according to an embodiment of the present disclosure.

FIG. 3 is a schematic diagram of circuit structure of a current supply circuit in an embodiment of the present disclosure, and as shown in FIG. 3, in some implementations, the current supply circuit 2 includes: a reset circuit 201, a writing and compensation circuit 202, an output control circuit 203, and a driving transistor DTFT, and a control electrode of the driving transistor DTFT, the reset circuit 201, and the threshold compensation circuit 202 are coupled to a control node N2.

The reset circuit 201 is coupled to the first power supply terminal and the first control signal line CL1, the reset circuit 201 is configured to write the first voltage provided by the first power supply terminal to the control node N2 in response to control of the first control signal line CL1.

The writing and compensation circuit 202 is coupled to the second power supply terminal, the second control signal line CL2, a first electrode of the driving transistor DTFT, and a second electrode of the driving transistor DTFT, and the writing and compensation circuit 202 is configured to write a second voltage provided by the second power supply terminal to the second electrode of the driving transistor DTFT in response to control of the second control signal line CL2, and write a control voltage to the control node N2, the control voltage being equal to a sum of the second voltage and a threshold voltage of the driving transistor DTFT.

The output control circuit 203 is coupled to a third power supply terminal and a third control signal line CL3, and the output control circuit 203 is configured to write a third voltage provided by the third power supply terminal to the second electrode of the driving transistor DTFT in response to control of the third control signal line CL3.

The driving transistor DTFT is configured to output a driving current to the signal reading line RL in response to the control voltage and the third voltage to supply a constant current to the output terminal of the source follower circuit 4.

In the present embodiment, the process of supplying the constant current by the current supply circuit 2 shown in FIG. 3 will be described in detail by taking a first voltage Vrst being provided by the first power supply terminal, a second voltage Vq being provided by the second power supply terminal, and a third voltage Vss being provided by the third power supply terminal as an example. Here, the control voltage Vcon=Vq+Vth, where Vth is a threshold voltage of the driving transistor DTFT.

When a gate voltage of the driving transistor DTFT is the control voltage Vcon and the voltage of the second electrode is Vss, a saturated driving current of the driving transistor DTFT can be obtained as follows:

$$I = \frac{1}{2}K_{DTFT} + (Vgs - Vth)^2 = \frac{1}{2}K_{DTFT} * (Vcon - Vss - Vth)^2 = \quad (2)$$

$$\frac{1}{2}K_{DTFT} * (Vq + Vth - Vss - Vth)^2 = \frac{1}{2}K_{DTFT} * (Vq - Vss)^2$$

where I is a driving current output by the driving transistor DTFT (i.e., a constant current is supplied to the output terminal of the source follower circuit 4); $K_{DTFT}$ is constant and the value thereof is related to the threshold voltage and electron mobility of the driving transistor DTFT.

As can be seen from the above equation (2), the driving current output by the driving transistor DTFT is independent of the threshold voltage Vth of the driving transistor DTFT and is related to the second voltage Vq, and thus the driving transistor DTFT can output a constant voltage in a case where the second voltage Vq is constant. In practical applications, a magnitude of the constant current output by the driving transistor DTFT may be set by setting the value of the second voltage Vq.

Figure 4:
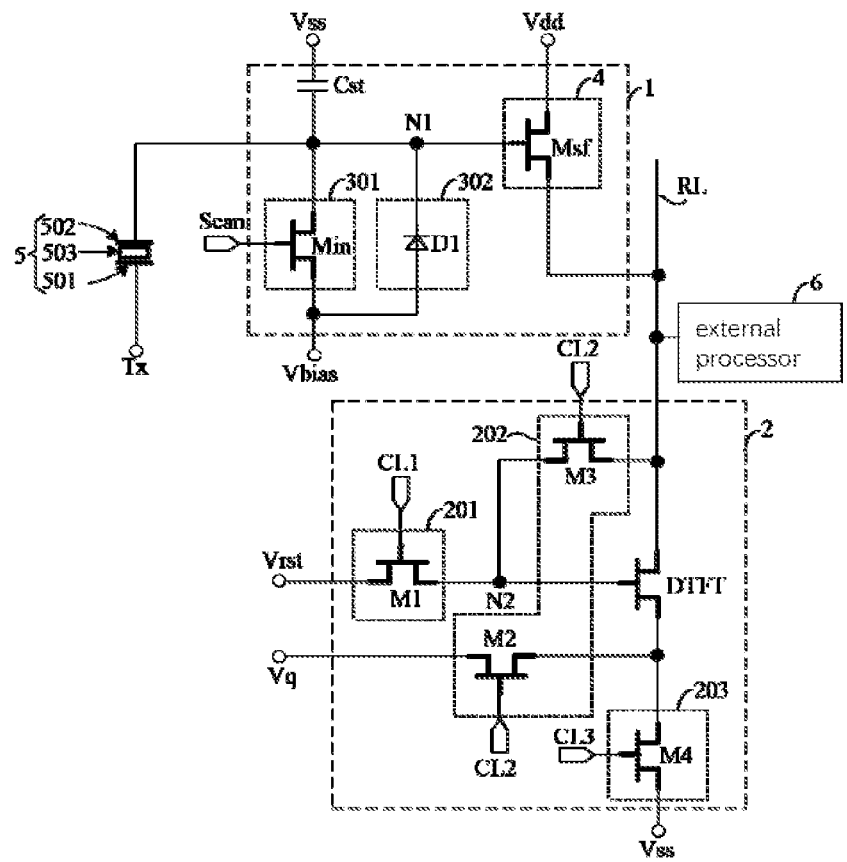
FIG. 4 is a schematic diagram of circuit structure of an ultrasonic fingerprint identification component according to an embodiment of the present disclosure.

FIG. 4 is a schematic diagram of circuit structure of an ultrasonic fingerprint identification component provided in an embodiment of the present disclosure, and as shown in FIG. 4, the ultrasonic fingerprint identification component shown in FIG. 4 is a specific optional solution based on the ultrasonic fingerprint identification component shown in FIG. 1, and the current supply circuit in the ultrasonic fingerprint identification component shown in FIG. 4 is a specific optional solution based on the current supply circuit shown in FIG. 3.

In some implementations, the reset circuit 201 includes: a first transistor M1; a control electrode of the first transistor M1 is coupled to the first control signal line CL1, a first electrode of the first transistor M1 is coupled to the first power supply terminal, and a second electrode of the first transistor M1 is coupled to the control node N2.

In some implementations, the writing and compensation circuit 202 includes: a second transistor M2 and a third transistor M3; a control electrode of the second transistor M2 is coupled to the second control signal line CL2, a first electrode of the second transistor M2 is coupled to the second power supply terminal, and a second electrode of the second transistor M2 is coupled to the second electrode of the driving transistor DTFT; a control electrode of the third transistor M3 is coupled to the second control signal line CL2, a first electrode of the third transistor M3 is coupled to the first electrode of the driving transistor DTFT, and a second electrode of the third transistor M3 is coupled to the control node N2.

In some implementations, the output control circuit 203 includes: a fourth transistor M4; a control electrode of the fourth transistor M4 is coupled to the third control signal line CL3, a first electrode of the fourth transistor M4 is coupled to the second electrode of the driving transistor DTFT, and a second electrode of the fourth transistor M4 is coupled to the third power supply terminal.

In the present embodiment, the process of supplying a constant current by the current supply circuit 2 shown in FIG. 4 will be described in detail by taking the first voltage Vrst being provided by the first power supply terminal, the second voltage Vq being provided by the second power supply terminal, and the third voltage Vss being provided by the third power supply terminal as an example.

Figure 5A:
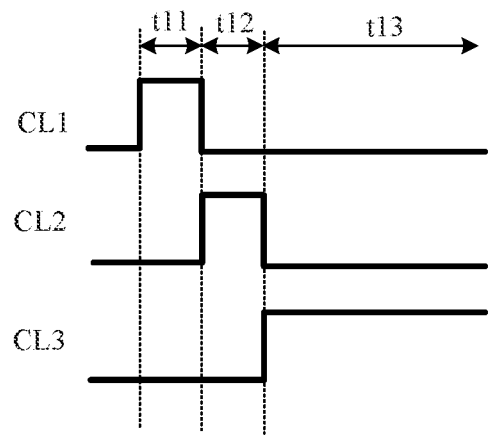
FIG. 5a is a timing diagram illustrating a driving operation of the current supply circuit shown in FIG. 4.

FIG. 5a is a timing diagram illustrating a driving operation of the current supply circuit shown in FIG. 4, and as shown in FIG. 5, the operation process of the current supply circuit 2 includes the following stages.

In a reset stage t11, the first control signal line CL1 provides a high level control signal, and the second control signal line CL2 and the third control signal line CL3 each provide a low level control signal. At this time, the first transistor M1 is turned on, and the second transistor M2, the third transistor M3, and the fourth transistor M4 are all turned off. Since the first transistor M1 is turned on, the first voltage Vrst is written to the control node N2 through the first transistor M1.

In a writing and compensation stage t12, the second control signal line CL2 provides a high level control signal, and the first control signal line CL1 and the third control signal line CL3 each provide a low level control signal. At this time, the second transistor M2 and the third transistor M3 are turned on, and the first transistor M1 and the fourth transistor M4 are both turned off. Since the second transistor M2 is turned on, the second voltage Vq is written to the second electrode of the driving transistor DTFT through the second transistor M2. Meanwhile, since the third transistor M3 is turned on, the second electrode of the driving transistor DTFT charges the control node N2 through the driving transistor DTFT and the third transistor M3, and when the voltage of the control node N2 becomes Vq+Vth, the driving transistor DTFT is turned off and the charging is finished. At this time, the voltage of the control node N2 is the control voltage Vcon=Vq+Vth.

At an output stage t13, the third control signal line CL3 provides a high level control signal, and the first control signal line CL1 and the second control signal line CL2 each provide a low level control signal. At this time, the fourth transistor M4 is turned on, and the first transistor M1, the second transistor M2, and the third transistor M3 are all turned off. Since the fourth transistor M4 is turned on, the third voltage Vss is written to the second electrode of the driving transistor DTFT through the fourth transistor M4, and the driving transistor DTFT is turned on again and outputs a driving current. Based on the above equation (2), it can be seen that the driving current output by the driving transistor DTFT is as follows.

$$I = \frac{1}{2} K_{DTFT} * (Vq - Vss)^2$$

The case where the transistors in the current supply circuit 2 are N-type transistors simultaneously is only a preferable implementation of the embodiment of the present disclosure, and the transistors in the current supply circuit 2 can be simultaneously manufactured by a same process, which is beneficial to reducing process steps and shortening the production cycle. Certainly, the above-described effects can also be achieved by using P-type transistors as the transistors in the current supply circuit 2. The technical solution of the present disclosure may select the transistors in the current supply circuit 2 from N-type transistors or P-type transistors, and the technical solution of the present disclosure does not limit the type of the transistors in the current supply circuit 2.

In the present embodiment, a voltage stabilizing capacitor (not shown) may be further provided in the current supply circuit 2, a terminal of the voltage stabilizing capacitor being coupled to the control node N2, and the other terminal of the voltage stabilizing capacitor being coupled to a constant voltage power supply terminal. The voltage at the control node N2 can be maintained as the control voltage all the time by the voltage stabilizing capacitor during the output stage t13, so as to ensure that the driving transistor DTFT outputs a constant current.

In some implementations, the detection circuit 3 includes: an input circuit 301 and a noise reduction reset circuit 302.

The input circuit 301 is coupled to a bias voltage terminal Vbias, an input control signal line Scan, and the receiving electrode 502 of the ultrasonic sensor 5, and the input circuit 301 is configured to write a first bias voltage provided by the bias voltage terminal Vbias to the receiving electrode 502 of the ultrasonic sensor 5 in response to control of the input control signal line.

The noise reduction reset circuit 302 is coupled to the bias voltage terminal Vbias, and the noise reduction reset circuit 302 is configured to write a second bias voltage provided by the bias voltage terminal Vbias to the sampling node N1, where the first bias voltage is smaller than the second bias voltage.

In some implementations, the input circuit 301 includes: an input transistor Min; a control electrode of the input transistor Min is coupled to the input control signal line Scan, a first electrode of the input transistor Min is coupled to the bias voltage terminal Vbias, and a second electrode of the input transistor Min is coupled to the receiving electrode 502 of the ultrasonic sensor 5; the noise reduction reset circuit 302 includes: a voltage supply diode D1; a first terminal of the voltage supply diode D1 is coupled to the bias voltage terminal Vbias, and a second terminal of the voltage supply diode D1 is coupled to the sampling node N1.

The source follower circuit 4 includes: a source follower transistor Msf; a control electrode of the source follower transistor Msf is coupled to the sampling node N1, a first electrode of the source follower transistor Msf is coupled to a fourth power supply terminal, and a second electrode of the source follower transistor Msf is coupled to the output terminal of the source follower circuit 4.

In the embodiment, the operation process of the ultrasonic fingerprint identification circuit 1 shown in FIG. 4 is described in detail by taking a fourth voltage Vdd being provided by the fourth power supply terminal and a first bias voltage Vb1 and a second bias voltage Vb2 being provided by the bias voltage terminal Vbias as an example.

Figure 5B:
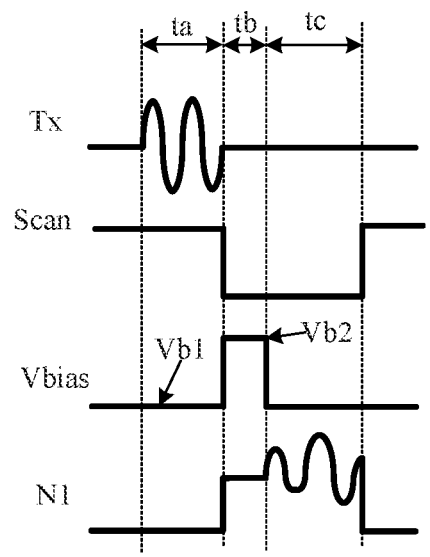
FIG. 5b is a timing diagram illustrating a driving operation of the ultrasonic fingerprint identification circuit shown in FIG. 4.

FIG. 5b is a timing diagram of driving operation of the ultrasonic fingerprint identification circuit shown in FIG. 4, and as shown in FIG. 5b, the operation process of the ultrasonic fingerprint identification circuit 1 includes the following stages.

In a transmitting stage ta, a driving signal terminal Tx supplies a driving signal (e.g., a sine wave signal) to the transmitting electrode 501, the input control signal line Scan supplies a high level control signal, and the bias voltage terminal Vbias supplies the first bias voltage Vb1. At this time, the input transistor Min is turned on, the first bias voltage Vb1 is written to the receiving electrode 502 through the input transistor Min, and the piezoelectric element 503 transmits ultrasonic waves based on an inverse piezoelectric effect.

In a denoising stage tb, the driving signal terminal Tx supplies a constant voltage to the transmitting electrode 501, the input control signal line Scan supplies a low level control signal, and the bias voltage terminal Vbias supplies the second bias voltage Vb2. At this time, the input transistor Min is turned off. Since the second bias voltage Vb2 is smaller than the first bias voltage Vb1, current flows through the voltage supply diode D1 to charge the sampling node N1 until the voltage at the sampling node N1 is Vb2-ΔV_D1, so that denoising and reset processing on the voltage at the sampling node N1 are realized; where ΔV_D1 is the voltage across the voltage supply diode D1, and a magnitude of the voltage across the voltage supply diode D1 is related to the electrical characteristics of the voltage supply diode D1 (e.g., the threshold voltage of the voltage supply diode D1).

Noise is present at the sampling node N1 because other film layers located between the fingerprint and the ultrasonic sensor 5 may first reflect the ultrasonic waves before the echoes reflected by the fingerprint reach the ultrasonic sensor 5 and cause the ultrasonic sensor 5 to output an electrical signal. In order to eliminate the noise, a denoising stage is set before the sampling stage to remove the noise and reset the sampling node N1, so that the influence of the noise reflected by the other film layers on a reception of the ultrasonic waves reflected by the fingerprint can be avoided.

In a sampling stage tc, the driving signal terminal Tx supplies a constant voltage to the transmitting electrode 501, the input control signal line Scan supplies a low level control signal, and the bias voltage terminal Vbias supplies a first bias voltage Vb1. The ultrasonic sensor 5 receives the echoes reflected by the fingerprint and outputs an electrical signal through the receiving electrode 502, which may charge the sampling node N1. It should be noted that, since the electrical signal output by the receiving electrode 502 is an alternating current signal, the electrical signal includes a positive current portion and a negative current portion, where the positive current portion can raise the voltage at the sampling node N1, and the negative current portion can lower the voltage at the sampling node N1. When the voltage at the sampling node N1 is Vb1-ΔV_D1, if a negative current is received at the sampling node N1, the voltage at the sampling node N1 does not continuously drop, but remains at Vb1-ΔV_D1, because once the voltage at the sampling node N1 is smaller than Vb1-ΔV_D1, a current is generated in the voltage supply diode D1 (the voltage at the other terminal of the voltage supply diode D1 is Vb1), so that the voltage at the sampling node N1 is pulled up to Vb1-ΔV_D1.

During the sampling stage tc, the voltage at the sampling node N1 changes continuously, and the voltage output by the output terminal of the source follower circuit 4 also changes continuously. When the current at the output terminal of the source follower circuit 4 is constant, since the voltage output by the output terminal of the source follower circuit 4 and the voltage at the input terminal (i.e., the voltage at the sampling node N1) are in a linear positive correlation, the time when the output terminal of the source follower circuit 4 outputs the maximum voltage at the sampling stage tc is the time when the sampling node N1 has the maximum voltage. The maximum voltage at the sampling node N1 is the "sensing voltage", and the maximum voltage at the output terminal of the source follower circuit 4 is the "source follower voltage".

In some implementations, a storage capacitor Cst is further disposed at the sampling node N1, one terminal of the storage capacitor Cst is coupled to the sampling node N1, and the other terminal of the storage capacitor Cst is coupled to a constant voltage terminal, and the storage capacitor Cst can effectively ensure stable voltage variation at the sampling node N1.

Certainly, in some implementations, a rectifying diode (not shown) is further disposed between the receiving electrode 502 and the sampling node N1, so that only the positive current portion of the alternating current signal output by the receiving electrode 502 can pass through (the negative current portion cannot pass through) the rectifying diode to charge the sampling node N1, and the voltage at the sampling node N1 would continuously rise during the sampling process. At this time, a reset transistor (not shown) is further provided at the sampling node N1, so that a preset reset voltage is written to the sampling node N1 by controlling the reset transistor to be turned on at an end of the sampling stage tc, thereby pulling the voltage at the sampling node N1 low.

Figure 6:
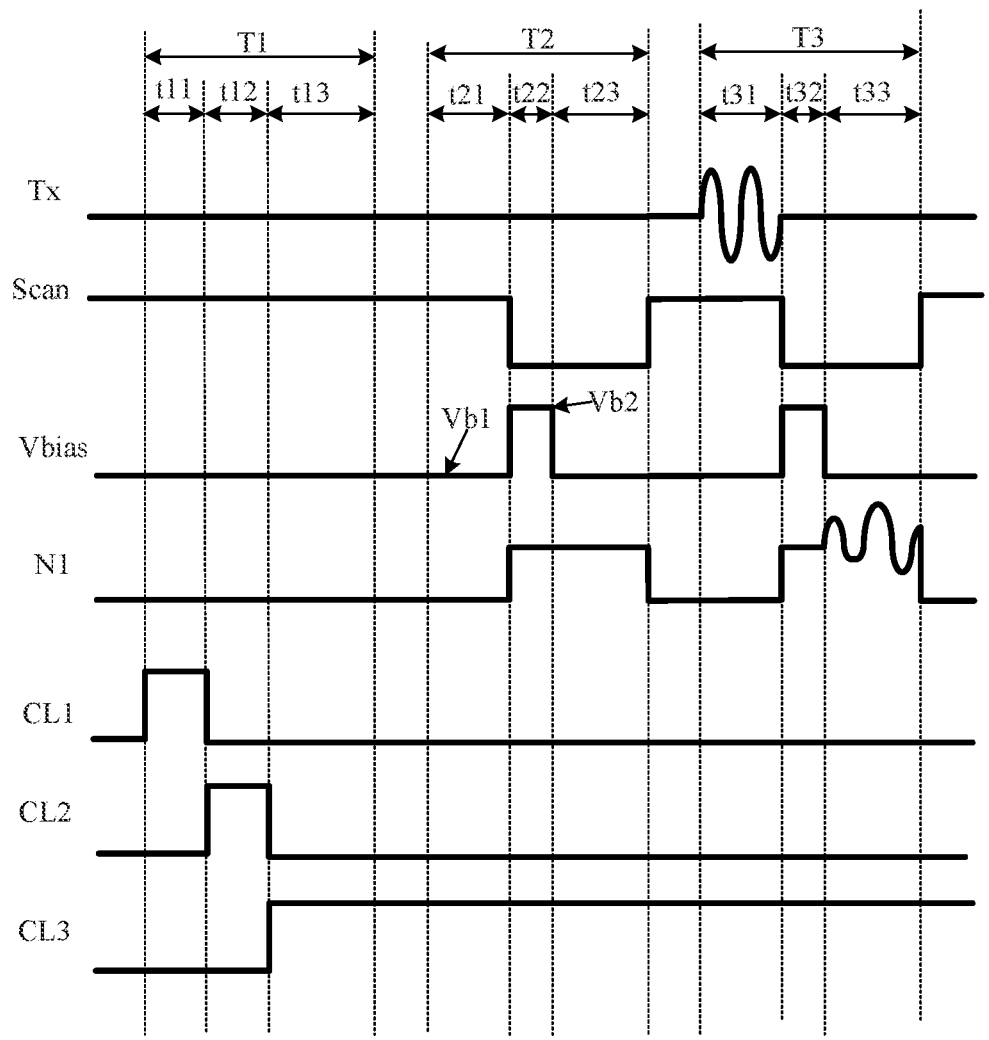
FIG. 6 is a timing diagram illustrating an operation of the ultrasonic fingerprint identification component shown in FIG. 4.

FIG. 6 is a timing diagram illustrating an operation of the ultrasonic fingerprint identification component shown in FIG. 4, and as shown in FIG. 6, the operation of the ultrasonic fingerprint identification component includes: a preliminary stage T1, a first sensing stage T2 and a second sensing stage T3.

The preliminary stage T1 includes: a reset stage t11, a writing and compensation stage t12 and an output stage t 13. For the detailed description of the reset stage t11, the writing and compensation stage t12 and the output stage t13, reference may be made to the corresponding description of FIG. 5a, and details are not repeated herein. In the embodiment of the present disclosure, after the output stage t13 is ended, as long as the third control signal line CL3 continuously provides a high level control signal, the current supply circuit 2 can continuously output the constant current for the first sensing stage T2 and the second sensing stage T3.

The first sensing stage T2 includes: a constant voltage applying stage t21, a first denoising stage t22 and a first sampling stage t23; in the constant voltage applying stage t21, the driving signal terminal Tx applies a constant voltage instead of the driving signal to the transmitting electrode 501, and thus the ultrasonic sensor 5 would not transmit ultrasonic waves. For the specific description of the constant voltage applying stage t21, the first denoising stage t22 and the first sampling stage t23, reference may be made to the corresponding description of the "first ultrasonic fingerprint identification stage" and FIG. 5b, and details are not repeated herein. In the first sampling stage t23, the receiving electrode 502 of the ultrasonic sensor 5 outputs a first electrical signal, the detection circuit 3 outputs a first sensing voltage to the sampling node N1 according to the first electrical signal, and the source follower circuit 4 outputs a first source follower voltage according to the first sensing voltage under control of the constant current.

In the first sensing stage T2, the first sensing voltage is denoted as Vin_1, and the first source follower voltage is denoted as Vout_1, and at this time, it is satisfied:

$$\text{Vout\_1} = \text{Vin\_1} - Vth_{\_Msf} - \sqrt{\frac{2I}{K_{Msf}}} \quad (3)$$

where $Vth_{\_Msf}$ is a threshold voltage of the source follower transistor Msf, I is the constant current provided by the current supply circuit 2, $K_{Msf}$ is constant and its magnitude is related to the threshold voltage and electron mobility of the source follower transistor Msf.

The second sensing stage T3 includes: a transmitting stage t31, a second denoising stage t32 and a second sampling stage t 33; for specific description of the transmitting stage t31, the second denoising stage t32 and the second sampling stage t33, reference may be made to the corresponding description of the "second ultrasonic fingerprint identification stage" and FIG. 5b, and details are not repeated herein. In the second sampling stage t33, the receiving electrode 502 of the ultrasonic sensor 5 outputs a second electrical signal, the detection circuit 3 outputs a second sensing voltage to the sampling node N1 according to the second electrical signal, and the source follower circuit 4 outputs a second source follower voltage according to the second sensing voltage under control of the constant current.

In order to ensure the accuracy of the subsequent identification result, the constant voltage applying stage t21 has the same or approximately the same duration as the transmitting stage t31, the first denoising stage t22 has the same or approximately the same duration as the second denoising stage t32, and the first sampling stage t23 has the same or approximately the same duration as the second sampling stage t 33.

In the second sensing stage T3, the second sensing voltage is denoted as Vin_2, and the second source follower voltage is denoted as Vout_2, and at this time, it is satisfied:

$$\text{Vout\_2} = \text{Vin\_2} - Vth_{\_Msf} - \sqrt{\frac{2I}{K_{Msf}}} \quad (4)$$

The external processor 6 can read the second source follower voltage Vout_2 and the second source follower voltage Vout_1 through the signal reading line RL by calculating a difference between equations (3) and (4):

$$\text{Vout\_2} - \text{Vout\_1} = \quad (5)$$
$$\text{Vin\_2} - Vth_{\_Msf} - \sqrt{\frac{2I}{K_{Msf}}} - \left(\text{Vin\_1} - Vth_{\_Msf} - \sqrt{\frac{2I}{K_{Msf}}}\right) =$$
$$\text{Vin\_2} - \text{Vin\_1}$$

The difference between the second sensing voltage Vin_2 and the first sensing voltage Vin_1 can be obtained, that is, the change of the voltage at the sampling node N1 after being applied with the alternating current electrical signal generated by the echoes of the fingerprint can be obtained, and the valleys and the ridges of the fingerprint can be determined based on the difference.

As can be seen from the above equation (5), by obtaining the difference between the second sensing voltage Vin_2 and the first sensing voltage Vin_1 by subtracting the first source follower voltage Vout_1 from the second source follower voltage Vout_2, the influence of shift of the electrical characteristics of the electrical elements in the source follower circuit 4 on the detection process can be eliminated (the difference between Vin_2 and Vin_1 is independent of $Vth_{\_Msf}$ and $K_{Msf}$), and the signal reliability can be ensured. Meanwhile, by calculating the difference between the second sensing voltage Vin_2 and the first sensing voltage Vin_1, the influence of shift of the electrical characteristics of the electrical elements in the detection circuit 3 on the voltage at the sampling node N1 can be eliminated, and the identification accuracy can be effectively improved.

In the present disclosure, specific structures of the ultrasonic fingerprint identification circuit 1 and the current supply circuit 2 are not limited to those shown in FIG. 4, and the case shown in FIG. 4 is only an alternative implementation of the embodiment of the present disclosure, which does not limit the technical solution of the present disclosure. For example, the ultrasonic fingerprint identification circuit 1 is any ultrasonic fingerprint identification circuit 1 in the related art, and the current supply circuit 2 directly uses a direct current source, which is not illustrated herein.

Figure 7:
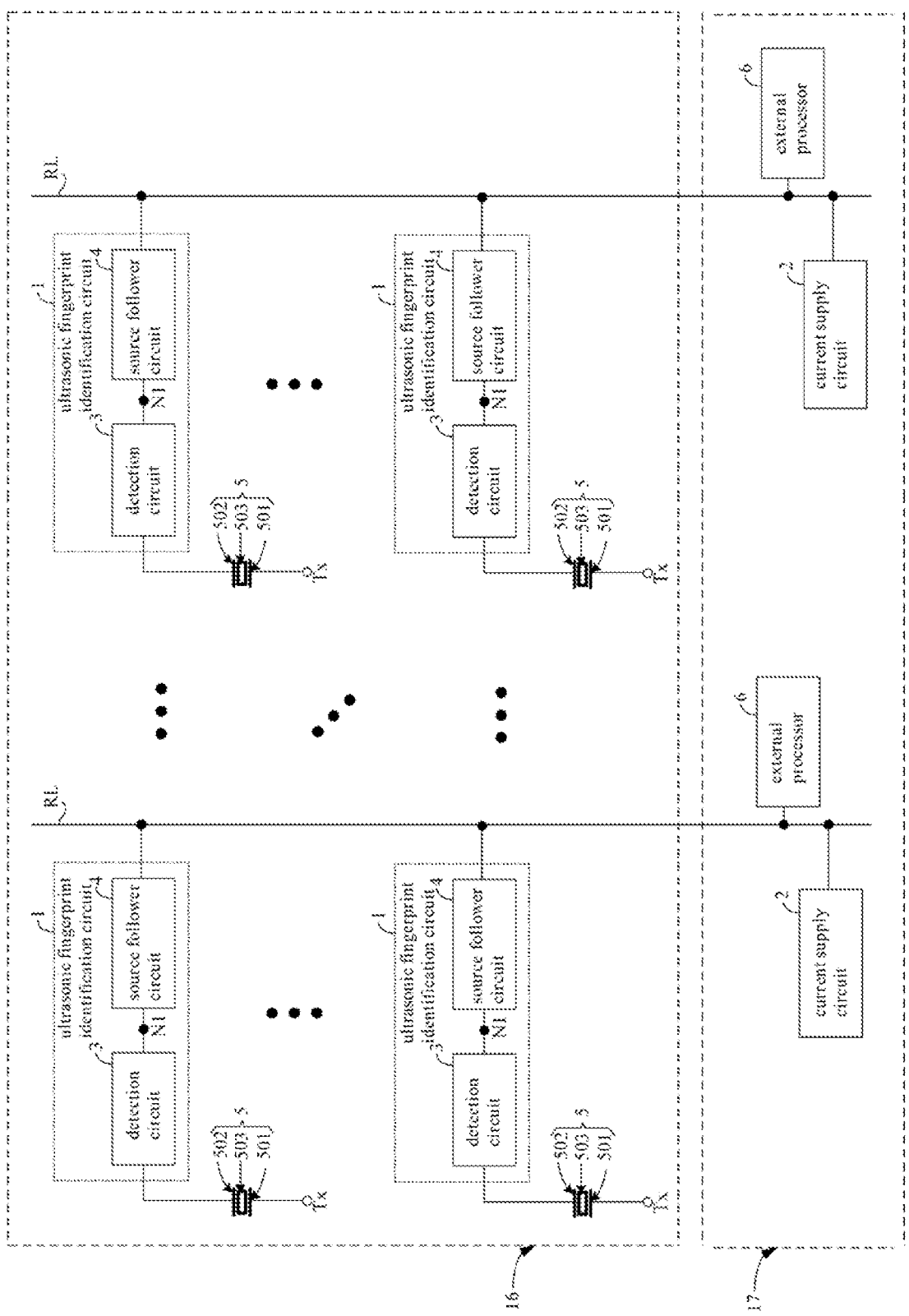
FIG. 7 is a schematic diagram of circuit structure of a fingerprint identification device according to an embodiment of the present disclosure.

FIG. 7 is a schematic diagram of circuit structure of a fingerprint identification device according to an embodiment of the present disclosure, as shown in FIG. 7, the fingerprint identification device includes: at least one ultrasonic sensor 5 and an ultrasonic fingerprint identification component as provided in the above embodiment.

In some implementations, the fingerprint identification device includes a plurality of ultrasonic sensors 5 arranged in an array and a plurality of ultrasonic fingerprint identification circuits 1 arranged in an array, where the ultrasonic sensors 5 are in one-to-one correspondence with the ultrasonic fingerprint identification circuits 1; output terminals of source follower circuits 4 in the ultrasonic fingerprint identification circuits 1 in a same column are coupled to a same current supply circuit 2 through a same signal reading line RL. At this time, the number of the current supply circuits 2 in the fingerprint identification device can be effectively reduced, and the load on each signal reading line RL is not too large.

When the ultrasonic fingerprint identification circuits 1 located in the same column correspond to the same signal reading line RL and the same current supply circuit 2, the timing of operations of the ultrasonic fingerprint identification circuits 1 located in the same column but in different rows can be designed so that the ultrasonic fingerprint identification circuits 1 sequentially perform a first detection stage and a second detection stage. For example, the current supply circuit 2 first performs the process of the preliminary stage to output a constant current, then the ultrasonic fingerprint identification circuit 1 in the first row performs processes of the first detection stage and the second detection stage, then the ultrasonic fingerprint identification circuit 1 in the second row performs the first detection stage and the second detection stage process, and so on, until the ultrasonic fingerprint identification circuit 1 in the last row performs processes of the first detection stage and the second detection stage.

In some implementations, the fingerprint identification device includes a fingerprint identification functional area 16 and a non-functional area 17 located at a periphery of the fingerprint identification functional area; the ultrasonic sensors 5 and the ultrasonic fingerprint identification circuits 1 are positioned in the fingerprint identification functional area 16, and the current supply circuit 2 is positioned in the non-functional area 17.

In some implementations, the fingerprint identification device further includes: a display panel; the ultrasonic sensors 5 and the ultrasonic fingerprint identification components are fixed on an outer surface of the display panel in a plug-in mode; or, the ultrasonic sensors 5 and the ultrasonic fingerprint identification components are integrated inside the display panel in an embedded mode.

Figure 8:
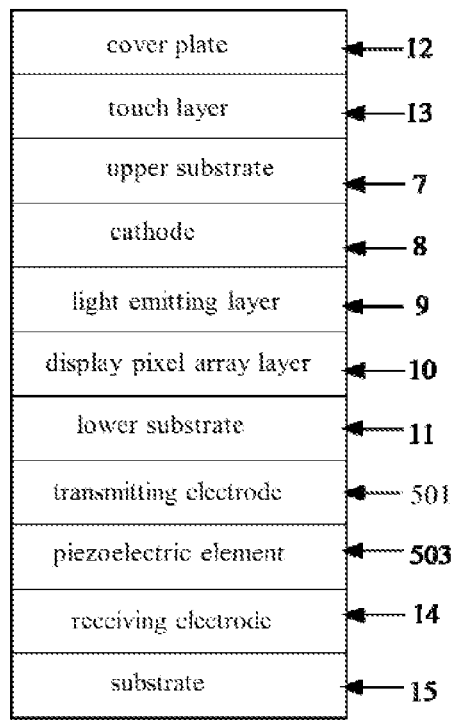
FIG. 8 is a schematic diagram illustrating the ultrasonic sensors and the ultrasonic fingerprint identification components being fixed on an outer surface of a display panel in a plug-in mode.

FIG. 8 is a schematic diagram illustrating that the ultrasonic sensors and the ultrasonic fingerprint identification components are fixed on an outer surface of a display panel in a plug-in mode, and as shown in FIG. 8, as an example, the display panel is an Organic Light Emitting Display (OLED), and the display panel, sequentially from top to bottom in FIG. 8, includes: an upper substrate 7, a cathode 8, a light emitting layer 9, a display pixel array layer 10 and a lower substrate 11, where the display pixel array layer 10 includes a display pixel driving circuit for driving the organic light emitting diode to emit light, and the display pixel driving circuit generally includes a gate line, a data line, a thin film transistor, a capacitor, an anode and the like. In some implementations, a side of the upper substrate away from the lower substrate is further provided with a touch layer 13 and a cover plate 12.

Before the ultrasonic sensors 5 and the ultrasonic fingerprint identification components are fixed on the surface of the display panel in a plug-in mode, the array of the ultrasonic sensors 5, the array of the ultrasonic fingerprint identification circuits 1 and the plurality of current supply circuits 2 can be formed on the substrate to obtain a fingerprint identification substrate, and then the fingerprint identification substrate is fixed on the surface of the display panel in a plug-in mode. The fingerprint identification pixel array layer 14 shown in FIG. 8 represents the ultrasonic fingerprint identification circuit 1, the current supply circuit 2, and the receiving electrode 502 of the ultrasonic sensor 5.

Figure 9:
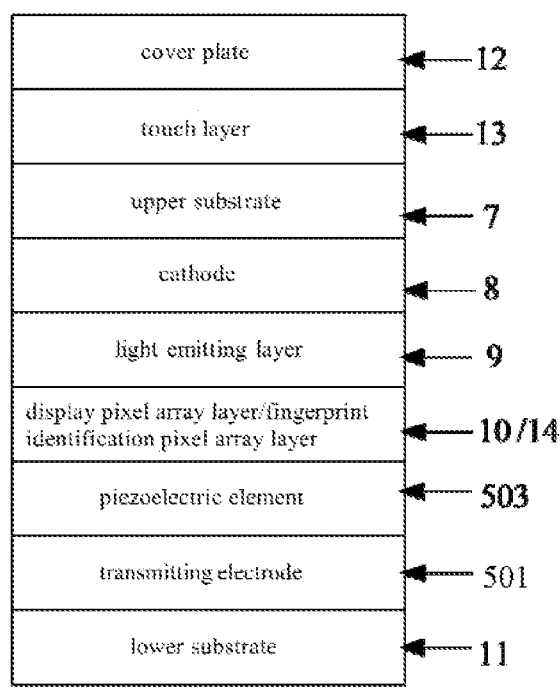
FIG. 9 is a schematic diagram illustrating the ultrasonic sensors and the ultrasonic fingerprint identification components being fixed on an outer surface of the display panel in an embedded mode.

FIG. 9 is a schematic diagram illustrating that the ultrasonic sensors and the ultrasonic fingerprint identification components are fixed on the outer surface of the display panel in an embedded mode, as shown in FIG. 9, which is different from that shown in FIG. 8 in that, the fingerprint identification pixel array layer 14 (including the ultrasonic fingerprint identification circuit 1, the current supply circuit 2, and the receiving electrode 502 of the ultrasonic sensor 5) in FIG. 9 is integrated in the display pixel array layer 10 in the display panel, the piezoelectric element 503 is located between the fingerprint identification pixel array layer 14/the display pixel array layer 10 and the lower substrate 11, and the transmitting electrode 501 is located between the piezoelectric element 503 and the lower substrate 11. In this way, a degree of integration of the fingerprint identification device can be greatly improved, and an overall thickness of the fingerprint identification device can be reduced.

FIG. 10 is a flowchart of a fingerprint identification driving method provided in an embodiment of the present disclosure, and as shown in FIG. 10, the fingerprint identification driving method is based on the ultrasonic fingerprint identification component provided in the foregoing embodiment, and the fingerprint identification driving method includes following steps S1 and S2.

Step S1, in a first sensing stage, the current supply circuit provides a constant current to the output terminal of the source follower circuit, the ultrasonic sensor does not transmit ultrasonic waves, the receiving electrode of the ultrasonic sensor outputs a first electrical signal, the detection circuit outputs a first sensing voltage to the sampling node according to the first electrical signal, and the source follower circuit outputs a first source follower voltage according to the first sensing voltage under control of the constant current.

Step S2, in a second sensing stage, the current supply circuit provides a constant current to the output terminal of the source follower circuit, the ultrasonic sensor transmits ultrasonic waves and receives echoes reflected by the fingerprint, the receiving electrode of the ultrasonic sensor outputs a second electric signal, the detection circuit outputs a second sensing voltage to the sampling node according to the second electric signal, and the source follower circuit outputs a second source follower voltage according to the second sensing voltage under control of the constant current.

For the specific description of step S1 and step S2, reference may be made to the corresponding description in the foregoing embodiment, and details are not repeated herein. The external processor determines the valleys and the ridges of the fingerprint based on the difference between the second source follower voltage and the first source follower voltage.

Figure 11:
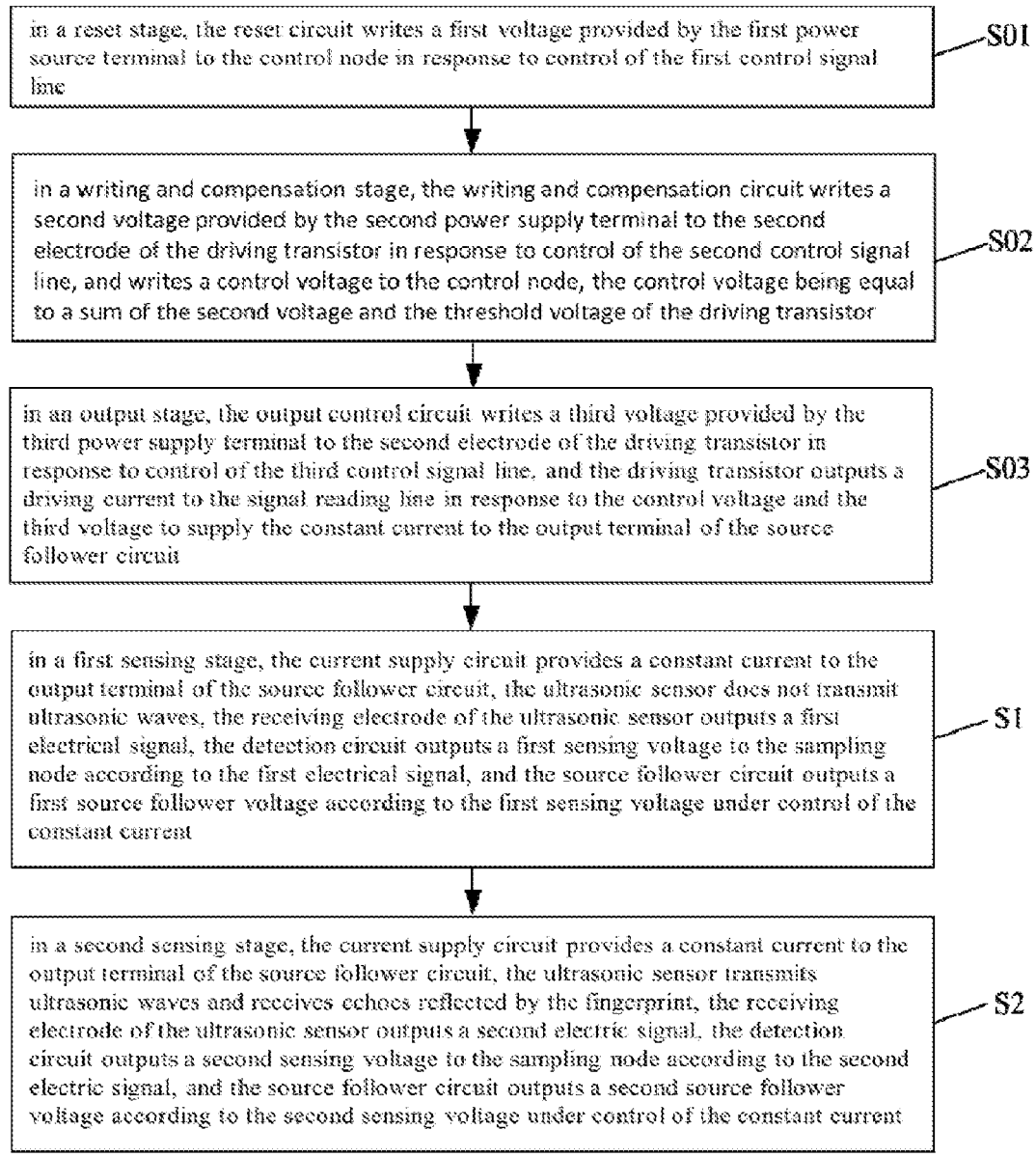
FIG. 11 is a flowchart of a fingerprint identification driving method according to another embodiment of the present disclosure.

FIG. 11 is a flowchart of a fingerprint identification driving method provided in another embodiment of the present disclosure, as shown in FIG. 11, the method is based on the ultrasonic fingerprint identification component provided in the foregoing embodiment, where the current supply circuit includes: a reset circuit, a writing and compensation circuit, an output control circuit and a driving transistor. The fingerprint identification driving method includes the above steps S1 and S2, and before step S1, further includes steps S01 to S03.

Step S01, in a reset stage, the reset circuit writes a first voltage provided by the first power supply terminal to the control node in response to control of the first control signal line.

Step S02, in a writing and compensation stage, the writing and compensation circuit writes a second voltage provided by the second power supply terminal to the second electrode of the driving transistor in response to control of the second control signal line, and writes a control voltage to the control node, the control voltage being equal to a sum of the second voltage and the threshold voltage of the driving transistor.

Step S03, in an output stage, the output control circuit writes a third voltage provided by the third power supply terminal to the second electrode of the driving transistor in response to control of the third control signal line, and the driving transistor outputs a driving current to the signal reading line in response to the control voltage and the third voltage to supply the constant current to the output terminal of the source follower circuit.

For the detailed description of step S01 to step S03, reference may be made to the corresponding description in the foregoing embodiment, and details are not repeated herein.

It will be understood that the above embodiments are merely exemplary embodiments adopted to illustrate principles of the present disclosure, and the present disclosure is not limited thereto. It will be apparent to those skilled in the art that various modifications and variants may be made without departing from the spirit and scope of the present disclosure, and such modifications and variants are considered to be within the scope of the present disclosure.

The invention claimed is:

1. An ultrasonic fingerprint identification component, comprising an ultrasonic fingerprint identification circuit and a current supply circuit, the ultrasonic fingerprint identification circuit includes a detection circuit and a source follower circuit, an output terminal of the detection circuit and an input terminal of the source follower circuit are coupled to a sampling node, and an output terminal of the source follower circuit is coupled to the current supply circuit through a signal reading line;
the current supply circuit is configured to provide a constant current to the output terminal of the source follower circuit during an operation of the ultrasonic fingerprint identification circuit;
the detection circuit is coupled to a receiving electrode of an ultrasonic sensor and is configured to output a sensing voltage to the sampling node according to an electric signal output by the receiving electrode of the ultrasonic sensor;
the source follower circuit is configured to output a corresponding source follower voltage to the signal reading line according to the sensing voltage under control of the constant current,
wherein the current supply circuit comprises: a reset circuit, a writing and compensation circuit, an output control circuit and a driving transistor, a control electrode of the driving transistor, the reset circuit and the writing and compensation circuit are coupled to a control node;
the reset circuit is coupled to a first power supply terminal and a first control signal line and is configured to write a first voltage provided by the first power supply terminal to the control node in response to control of the first control signal line;
the writing and compensation circuit is coupled to a second power supply terminal, a second control signal line, a first electrode of the driving transistor, and a second electrode of the driving transistor, is configured to write a second voltage provided by the second power supply terminal to the second electrode of the driving transistor and write a control voltage to the control node in response to control of the second control signal line, the control voltage being equal to a sum of the second voltage and a threshold voltage of the driving transistor;
the output control circuit is coupled to a third power supply terminal and a third control signal line and is configured to write a third voltage provided by the third power supply terminal to the second electrode of the driving transistor in response to control of the third control signal line;
the driving transistor is configured to output a driving current to the signal reading line in response to the control voltage and the third voltage to supply the constant current to the output terminal of the source follower circuit.

2. The ultrasonic fingerprint identification component according to claim 1, wherein the reset circuit comprises: a first transistor;
a control electrode of the first transistor is coupled to the first control signal line, a first electrode of the first transistor is coupled to the first power supply terminal, and a second electrode of the first transistor is coupled to the control node.

3. The ultrasonic fingerprint identification component according to claim 1, wherein the writing and compensation circuit comprises: a second transistor and a third transistor;
a control electrode of the second transistor is coupled to the second control signal line, a first electrode of the second transistor is coupled to the second power supply terminal, and a second electrode of the second transistor is coupled to the second electrode of the driving transistor;
a control electrode of the third transistor is coupled to the second control signal line, a first electrode of the third transistor is coupled to the first electrode of the driving transistor, and a second electrode of the third transistor is coupled to the control node.

4. The ultrasonic fingerprint identification component according to claim 1, wherein the output control circuit comprises: a fourth transistor;
a control electrode of the fourth transistor is coupled to the third control signal line, a first electrode of the fourth transistor is coupled to the second electrode of the driving transistor, and a second electrode of the fourth transistor is coupled to the third power supply terminal.

5. The ultrasonic fingerprint identification component according to claim 1, wherein transistors in the current supply circuit are all N-type transistors.

6. The ultrasonic fingerprint identification component according to claim 1, wherein the source follower circuit comprises: a source follower transistor;
a control electrode of the source follower transistor is coupled to the sampling node, a first electrode of the source follower transistor is coupled to a fourth power supply terminal, and a second electrode of the source follower transistor is coupled to the output terminal of the source follower circuit.

7. The ultrasonic fingerprint identification component according to claim 1, wherein the detection circuit comprises: an input circuit and a noise reduction reset circuit;
the input circuit is coupled to a bias voltage terminal, an input control signal line and the receiving electrode of the ultrasonic sensor and is configured to write a first bias voltage provided by the bias voltage terminal to the receiving electrode of the ultrasonic sensor in response to control of the input control signal line;

the noise reduction reset circuit is coupled to the bias voltage terminal and configured to write a second bias voltage provided by the bias voltage terminal to the sampling node, and the first bias voltage is smaller than the second bias voltage.

8. The ultrasonic fingerprint identification component according to claim 7, wherein the input circuit comprises an input transistor;
  a control electrode of the input transistor is coupled to the input control signal line, a first electrode of the input transistor is coupled to the bias voltage terminal, and a second electrode of the input transistor is coupled to the receiving electrode of the ultrasonic sensor;
  the noise reduction reset circuit comprises a voltage supply diode;
  a first electrode of the voltage supply diode is coupled to the bias voltage terminal, and a second electrode of the voltage supply diode is coupled to the sampling node.

9. A fingerprint identification device, comprising: at least one ultrasonic sensor and the ultrasonic fingerprint identification component according to claim 1.

10. The fingerprint identification device according to claim 9, comprising a plurality of ultrasonic sensors arranged in an array and a plurality of ultrasonic fingerprint identification components arranged in an array, and the ultrasonic sensors are in one-to-one correspondence with the ultrasonic fingerprint identification components;
  output terminals of source follower circuits in the ultrasonic fingerprint identification components in a same column are coupled to a same current supply circuit through a same signal reading line.

11. The fingerprint identification device according to claim 10, comprising a fingerprint identification functional area and a non-functional area located at a periphery of the fingerprint identification functional area;
  the ultrasonic sensors and the ultrasonic fingerprint identification components are located in the fingerprint identification functional area, and the current supply circuits are located in the non- functional area.

12. The fingerprint identification device according to claim 9, further comprising: a display panel;
  the ultrasonic sensors and the ultrasonic fingerprint identification components are fixed on an outer surface of the display panel in a plug-in mode.

13. A fingerprint identification driving method, based on the ultrasonic fingerprint identification component of claim 1, comprising:
  in a first sensing stage, the current supply circuit provides a constant current to the output terminal of the source follower circuit, the ultrasonic sensor does not transmit ultrasonic waves, the receiving electrode of the ultrasonic sensor outputs a first electric signal, the detection circuit outputs a first sensing voltage to the sampling node according to the first electric signal, and the source follower circuit outputs a first source follower voltage according to the first sensing voltage under control of the constant current;
  in a second sensing stage, the current supply circuit provides the constant current to the output terminal of the source follower circuit, the ultrasonic sensor transmits ultrasonic waves and receives echoes reflected by a fingerprint, the receiving electrode of the ultrasonic sensor outputs a second electric signal, the detection circuit outputs a second sensing voltage to the sampling node according to the second electric signal, and the source follower circuit outputs a second source follower voltage according to the second sensing voltage under control of the constant current, so that an external processor can determine that valleys and ridges of the fingerprint according to a difference between the second source follower voltage and the first source follower voltage.

14. The fingerprint identification driving method according to claim 13, wherein for the ultrasonic fingerprint identification component, the current supply circuit comprises a reset circuit, a writing and compensation circuit, an output control circuit and a driving transistor, a control electrode of the driving transistor, the reset circuit and the writing and compensation circuit are coupled to a control node; the reset circuit is coupled to a first power supply terminal and a first control signal line and is configured to write a first voltage provided by the first power supply terminal to the control node in response to control of the first control signal line; the writing and compensation circuit is coupled to a second power supply terminal, a second control signal line, a first electrode of the driving transistor, and a second electrode of the driving transistor, is configured to write a second voltage provided by the second power supply terminal to the second electrode of the driving transistor and write a control voltage to the control node in response to control of the second control signal line, the control voltage being equal to a sum of the second voltage and a threshold voltage of the driving transistor; the output control circuit is coupled to a third power supply terminal and a third control signal line and is configured to write a third voltage provided by the third power supply terminal to the second electrode of the driving transistor in response to control of the third control signal line; the driving transistor is configured to output a driving current to the signal reading line in response to the control voltage and the third voltage to supply the constant current to the output terminal of the source follower circuit, and
  the fingerprint identification driving method further comprising a preliminary stage before the first sensing stage, the preliminary stage comprising:
  in a reset stage, the reset circuit writes a first voltage provided by the first power supply terminal to the control node in response to control of the first control signal line;
  in a writing and compensation stage, the writing and compensation circuit writes a second voltage provided by the second power supply terminal to the second electrode of the driving transistor and writes a control voltage to the control node in response to control of the second control signal line, the control voltage being equal to a sum of the second voltage and a threshold voltage of the driving transistor;
  in an output stage, the output control circuit writes a third voltage provided by the third power supply terminal to the second electrode of the driving transistor in response to control of the third control signal line, and the driving transistor outputs a driving current to the signal reading line in response to the control voltage and the third voltage to supply the constant current to the output terminal of the source follower circuit.

15. The ultrasonic fingerprint identification component according to claim 1, wherein transistors in the current supply circuit are all P-type transistors.

16. The ultrasonic fingerprint identification component according to claim 1, wherein the detection circuit comprises: an input circuit and a noise reduction reset circuit;
the input circuit is coupled to a bias voltage terminal, an input control signal line and the receiving electrode of the ultrasonic sensor and is configured to write a first bias voltage provided by the bias voltage terminal to the receiving electrode of the ultrasonic sensor in response to control of the input control signal line;
the noise reduction reset circuit is coupled to the bias voltage terminal and configured to write a second bias voltage provided by the bias voltage terminal to the sampling node, and the first bias voltage is smaller than the second bias voltage.

17. The ultrasonic fingerprint identification component according to claim 3, wherein the detection circuit comprises: an input circuit and a noise reduction reset circuit;
the input circuit is coupled to a bias voltage terminal, an input control signal line and the receiving electrode of the ultrasonic sensor and is configured to write a first bias voltage provided by the bias voltage terminal to the receiving electrode of the ultrasonic sensor in response to control of the input control signal line;
the noise reduction reset circuit is coupled to the bias voltage terminal and configured to write a second bias voltage provided by the bias voltage terminal to the sampling node, and the first bias voltage is smaller than the second bias voltage.

18. The ultrasonic fingerprint identification component according to claim 3, wherein the detection circuit comprises: an input circuit and a noise reduction reset circuit;
the input circuit is coupled to a bias voltage terminal, an input control signal line and the receiving electrode of the ultrasonic sensor and is configured to write a first bias voltage provided by the bias voltage terminal to the receiving electrode of the ultrasonic sensor in response to control of the input control signal line;
the noise reduction reset circuit is coupled to the bias voltage terminal and configured to write a second bias voltage provided by the bias voltage terminal to the sampling node, and the first bias voltage is smaller than the second bias voltage.

19. The fingerprint identification device according to claim 9, further comprising: a display panel;
the ultrasonic sensors and the ultrasonic fingerprint identification components are integrated inside the display panel in an embedded mode.

* * * * *